Jan. 5, 1926. 1,568,839
W. K. HODGMAN ET AL
DRY PIPE VALVE
Filed Feb. 2, 1920
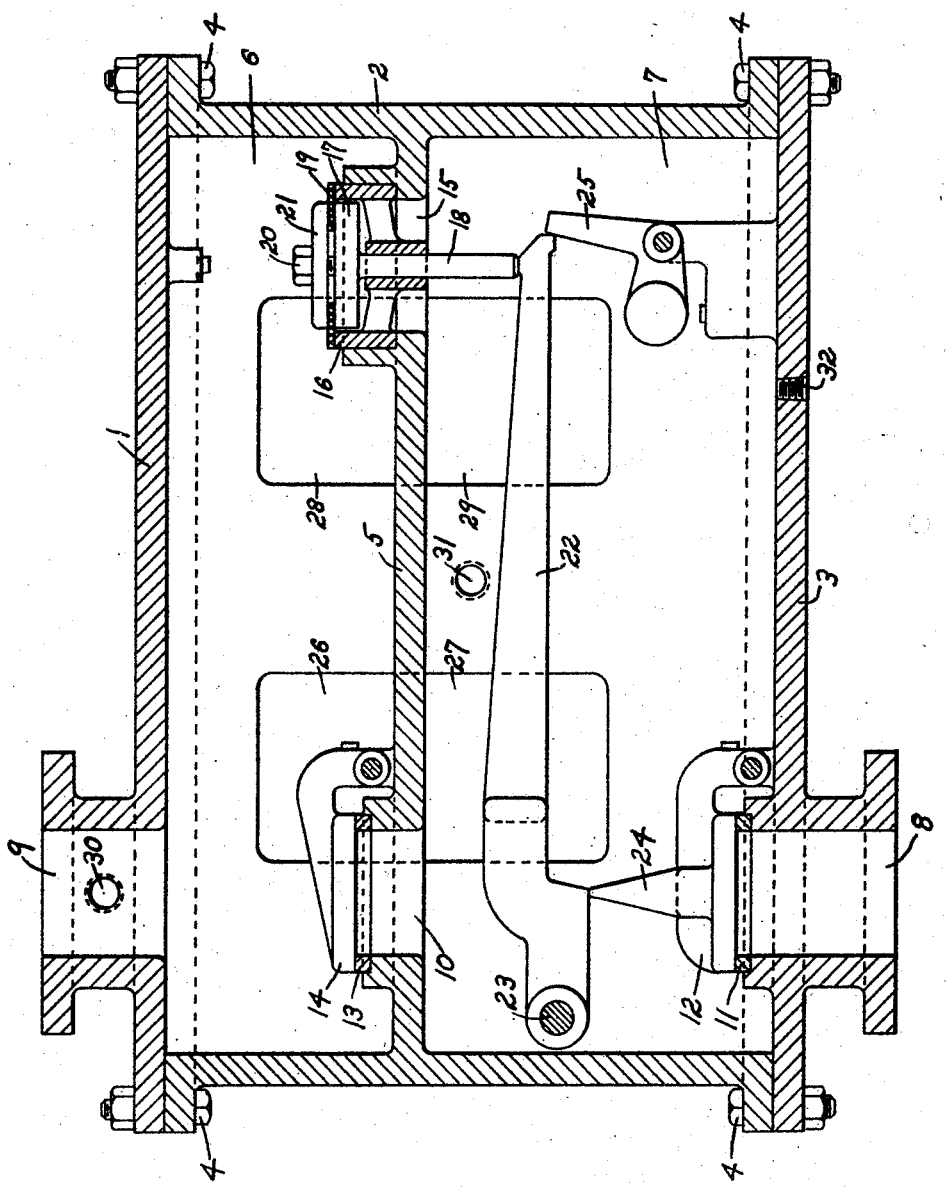
INVENTORS
Willis K. Hodgman.
Willis K. Hodgman. Jr.

Patented Jan. 5, 1926.

1,568,839

UNITED STATES PATENT OFFICE.

WILLIS K. HODGMAN AND WILLIS K. HODGMAN, JR., OF TAUNTON, MASSACHUSETTS; EMMA A. HODGMAN EXECUTRIX OF SAID WILLIS K. HODGMAN, DECEASED.

DRY-PIPE VALVE.

Application filed February 2, 1920. Serial No. 355,598.

*To all whom it may concern:*

Be it known that we, WILLIS K. HODGMAN and WILLIS K. HODGMAN, Jr., citizens of the United States, residing at Taunton, in the county of Bristol and State of Massachusetts, have invented new and useful Improvements in Dry-Pipe Valves, of which the following is a specification.

Our invention relates to improvements in dry pipe valves for use in automatic sprinkler systems, wherein a moderate amount of air pressure holds back a much heavier water pressure.

A common form of this type of dry pipe valve, known as the differential type, comprises a double-seated check valve having the air seat much larger than the water seat. The difference in area between the two seats determines the differential or difference in pressure necessary to balance the valve.

The objects of our invention are, first, to hold the water valve closed against the water under pressure by means of the lesser air pressure acting directly upon the water valve through an air-valve and a multiplying lever; and, second, to provide a straightway passage for the water through the valve-casing.

We attain these objects by mechanism, a preferred form of which is illustrated in the accompanying drawing which shows a longitudinal sectional view of a dry pipe valve embodying the invention.

The valve-casing comprises three parts 1, 2 and 3, fastened together by bolts 4. The horizontal partition 5, in the part 2, divides the valve-casing into upper and lower chambers 6 and 7.

The part 3 of the valve-casing is provided with an inlet opening 8 communicating with the water supply pipe, and the part 1 is provided with an outlet opening 9 communicating with the riser of a sprinkler system. The horizontal partition 5 is provided with a waterway opening 10, connecting the chambers 6 and 7, and directly in line with the openings 8 and 9. These three openings are all preferably round and of the same size, and, when open, provide a straightway passage through the valve-casing. The inlet opening 8 is provided with a valve-seat 11 for the water-valve 12, and the waterway opening 10 is provided with a valve-seat 13 for the waterway-valve 14. A second opening 15 through the partition 5 is provided with a combined valve-seat and guide 16 for the air-valve 17.

The air-valve 17 is preferably provided with a flexible annular lip 19 which seats upon the valve-seat 16 and is secured to the main body of the air-valve by the bolt 20 and washer 21.

When the air-valve 17 is in its normal position, the end of its stem 18 presses down upon the free end of the multiplying lever 22 which is fulcrumed on the pin 23 fast in the walls of the lower chamber 7. The fulcrum end of the lever 22 is forked so as not to obstruct the straightway passage through the valve-casing. When the parts are in their normal positions the lower edges of the forked portion of the lever 22 rest upon the top of the standards 24, of the water-valve 12, thus transferring the multiplied pressure of the air-valve 17 directly upon the water-valve 12.

The pivoted latch 25 is provided to engage the free end of the lever 22 and thus prevent the water-valve 12 from becoming effectively seated again after it is once opened or partially opened.

The valve-casing is provided with the hand holes 26, 27, 28 and 29 to permit access to the chambers 6 and 7 for the purpose of cleaning and resetting the valves. These hand holes are properly sealed by suitable covers (not shown) when the apparatus is in working order.

The opening 30, in the outlet 9, is fitted with a suitable valve (not shown) through which is introduced, when required, the water for priming the valves 14 and 17, and the air under pressure for holding the valves 12, 14 and 17 tightly seated.

This valve can also be used as a test valve to ascertain that the system is free from water down to its level.

A pipe (not shown) takes out of the opening 31, in the chamber 7, and connects with some usual alarm device which is caused to sound an alarm by the flowage of water from the chamber 7 when the water-valve is open. The opening 32 is equipped with a drip valve (not shown), which may be of the usual ball type, for the purpose of preserving atmospheric pressure in the chamber 7 and also to indicate any leakage of water from the valves 12, 14 and 17.

With the construction above described, when the waterway-valve 14, the air-valve 17 and the water-valve 12 are seated and the lever 22 unlatched and with the required air-pressure present in the sprinkler system, the water-valve will be held closed by the air-pressure in the system acting upon the air-valve and through the lever directly upon the water-valve, and, as will be understood, the air-pressure required to hold the water-valve closed may be materially less than the water-pressure, which is acting to open the water-valve, on account of the multiplying function of the lever.

When one of more sprinklers are released, the air-pressure in the system rapidly falls to a point below a predetermined minimum and then the preponderance of the water-pressure opens the water-valve, and also the air-valve, by means of the lever, which is then latched by the latch 25 in a position preventing the valves from becoming effectively seated again. The continued flow of the water into the chamber 7 opens the waterway-valve 14 thus establishing a straightway passage, for the water, through the valve-casing to the riser of the sprinkler system.

We are aware that prior to our invention mechanical dry pipe valves have been made with lever construction between the air-valves and the water-valves but in all such dry pipe valves the construction has comprised some means, consisting of an arrangement of cams, latches, abutments or the like, whereby a holding tendency is imposed upon the water-valves in addition to the multiplied air-pressure and wherein it has been found desirable, if not necessary, to provide falling weights to insure the opening of the water valves when the air-pressure is reduced below the predetermined pressure.

It will now be seen that our invention is of a type of dry pipe valve wherein the water-valve is held closed, against the water under pressure, by the multiplied effect of the lesser air-pressure alone and that we accomplish this result by the comparatively small air-valve acting directly upon the water-valve by means of the multiplying lever, whereas in the usual differential dry pipe valve the same result is accomplished by the increased area of the air-valve.

The terms "upper" and "lower" and similar terms employed herein are to be understood as relative merely and not as restricted.

We claim:

1. A dry pipe valve comprising a casing, a partition dividing the casing into upper and lower chambers, the said casing having an inlet opening into the lower chamber, an outlet opening from the upper chamber, a waterway opening through the partition all aligned to present a straight waterway through the casing, and a second opening through the partition, a water valve in the lower chamber for the inlet opening mounted on the casing to swing clear of the waterway when opening, a waterway valve in the upper chamber for the waterway opening mounted on the casing to swing clear of the waterway when open, an air valve in the upper chamber for the second opening, and a lever in the lower chamber fulcrumed to the casing, normally engaging the water valve and the air valve, proportioned so that a given pressure exerted by the air valve on the lever will counterbalance a greater pressure exerted by the water valve on the lever, and acting when released by movement of the air valve to free the water valve and allow it to swing to the open position.

2. A dry pipe valve comprising a casing, a partition dividing the casing into upper and lower chambers, the said casing having an inlet opening into the lower chamber, an outlet opening from the upper chamber, a waterway opening through the partition all alined to present a straight waterway through the casing, and a second opening through the partition, a water valve in the lower chamber for the inlet opening mounted on the casing to swing clear of the waterway when opening, a waterway valve in the upper chamber for the waterway opening mounted on the casing to swing clear of the waterway when open, an air valve in the upper chamber for the second opening, and a lever in the lower chamber fulcrumed to the casing, engaging intermediate its ends the water valve, engaging at its free end the air valve, bifurcated to straddle the waterway, and acting upon the opening of the air valve to free the water valve and allow it to swing to open position.

3. A dry pipe valve comprising the construction defined in claim 1, together with a latch movably mounted in the lower chamber and acting, upon the movement of the lever sufficiently to allow the opening of the water valve, to engage the lever and lock it against movement in the opposite direction.

4. A dry pipe valve having the constructions defined in claim 1 in which an opening is provided from the lower chamber to the atmosphere.

5. A dry pipe valve comprising a casing having an inlet opening, a water valve for the inlet opening, a second opening in the said casing, an air valve for said second opening held normally closed by air pressure thereon, in which the sole means for transmitting the pressure exerted upon the one valve to the other consists of a lever fulcrumed in the casing and engaging both valves whereby the pressure transmitted between the valves may be varied by proportioning the effective distances from the points of engagement of said valves with said lever to the fulcrum, and a latch movably mounted in the casing and acting, upon the movement of the lever sufficiently to allow the opening of the water valve, to engage the lever and lock it against movement in the opposite direction.

WILLIS K. HODGMAN.
WILLIS K. HODGMAN, Jr.